(12) United States Patent
Trillo Vargas et al.

(10) Patent No.: US 11,599,527 B2
(45) Date of Patent: Mar. 7, 2023

(54) OPTIMIZING DISTRIBUTED LEDGER STORAGE AND BATTERY USAGE IN IOT DEVICES

(71) Applicant: INTERNATIONAL BUSINESS MACHINES CORPORATION, Armonk, NY (US)

(72) Inventors: Jesus Gabriel Trillo Vargas, Guadalajara (MX); David Rodriguez Torres, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 17/026,348

(22) Filed: Sep. 21, 2020

(65) Prior Publication Data

US 2022/0092055 A1 Mar. 24, 2022

(51) Int. Cl.
*G06F 16/23* (2019.01)
*G06F 16/28* (2019.01)
*G16Y 40/10* (2020.01)
*G06Q 10/10* (2012.01)

(52) U.S. Cl.
CPC ......... *G06F 16/2379* (2019.01); *G06F 16/28* (2019.01); *G06Q 10/10* (2013.01); *G16Y 40/10* (2020.01)

(58) Field of Classification Search
CPC ..... G06F 16/2379; G06F 16/28; G16Y 40/10; G06Q 10/10
See application file for complete search history.

(56) References Cited

U.S. PATENT DOCUMENTS

| | | | |
|---|---|---|---|
| 9,849,364 B2 | 12/2017 | Tran | |
| 9,967,334 B2 | 5/2018 | Ford | |
| 2015/0181620 A1* | 6/2015 | Seok | ................. H04W 74/0816 370/336 |
| 2017/0177870 A1* | 6/2017 | Hildebrand | ............. G06F 21/57 |
| 2018/0284746 A1 | 10/2018 | Cella | |
| 2019/0297570 A1* | 9/2019 | Bharadwaj | ........ H04W 52/0209 |
| 2020/0055421 A1 | 2/2020 | Sastinsky | |

(Continued)

FOREIGN PATENT DOCUMENTS

| | | |
|---|---|---|
| CA | 2083946 C | 6/1998 |
| CN | 110663030 A | 1/2020 |

(Continued)

OTHER PUBLICATIONS

Faizin RN, Riasetiawan M, Ashari A. A Review of Missing Sensor Data Imputation Methods. In2019 5th International Conference on Science and Technology (ICST) Jul. 3, 20190 (vol. 1, pp. 1-6). IEEE. (Year: 2019).*

(Continued)

*Primary Examiner* — Mohsen Almani
(74) *Attorney, Agent, or Firm* — Elliot J. Shine

(57) ABSTRACT

A method, computer system, and a computer program product for data optimization is provided. The present invention may include performing a reading at a determined frequency, wherein the reading at the determined frequency is within a bracket parameter. The present invention may include determining a bracket value based on the bracket parameter. The present invention may include posting the bracket value to a subledger.

17 Claims, 12 Drawing Sheets

(56) References Cited

U.S. PATENT DOCUMENTS

| | | | | |
|---|---|---|---|---|
| 2020/0169388 | A1* | 5/2020 | Wei | H04L 9/321 |
| 2020/0184153 | A1* | 6/2020 | Bongartz | G06N 5/04 |
| 2020/0275278 | A1* | 8/2020 | Hanawa | H04W 12/121 |
| 2021/0191495 | A1* | 6/2021 | Dasilva | G06F 1/3212 |

FOREIGN PATENT DOCUMENTS

| | | |
|---|---|---|
| WO | 9119357 W | 12/1991 |
| WO | 2018170253 A1 | 9/2018 |

OTHER PUBLICATIONS

Liu Y, Dillon T, Yu W, Rahayu W, Mostafa F. Missing value imputation for industrial IoT sensor data with large gaps. IEEE Internet of Things Journal. Jan. 30, 2020;7(8):6855-67. (Year: 2020).*

Alsaig A, Alagar V, Chammaa Z, Shiri N. Characterization and efficient management of big data in iot-driven smart city development. Sensors. Jan. 2019;19(11):2430. (Year: 2019).*

Xu, Zhiwei, Lu Chao, and Xiaohui Peng. "T-REST: An open-enabled architectural style for the Internet of Things." IEEE Internet of Things Journal 6.3 (2018): 4019-4034. (Year: 2018).*

Ali, et al. "Blockchain-based Smart-IoT Trust Zone Measurement Architecture," COINS '19: Proceedings of the International Conference on Omni-Layer Intelligent Systems, May 2019, pp. 152-157, Crete, Greece, DOI: 10.1145/3312614.3312646 , Retrieved from the Internet: <URL: https://dl.acm.org/doi/abs/10.1145/3312614.3312646>.

Alladi, et al., "Blockchain in Smart Grids: A Review on Different Use Cases," PubMed.com, Nov. 8, 2019 [accessed on Mar. 30, 2020], 2 pages, DOI: 10.3390/s19224862, Retrieved from the Internet: <URL: https://pubmed.ncbi.nlm.nih.gov/31717262/>.

Hang, et al., "Design and Implementation of an Integrated IoT Blockchain Platform for Sensing Data Integrity," 2019, 26 pages, vol. 19, DOI: 10.3390/s19102228, Retrieved from the Internet: <URL: https://www.mdpi.com/1424-8220/19/10/2228/pdf-vor>.

Mell, et al., "The NIST Definition of Cloud Computing", National Institute of Standards and Technology, Special Publication 800-145, Sep. 2011, 7 pages.

Pyoung, et al., "Blockchain of Finite-Lifetime Blocks with Applications to Edge-based IoT," IEEE Internet of Things Journal, Mar. 2020 [ accessed on Jul. 29, 2020], pp. 2102-2116, vol. 7, No. 3, DOI: 10.1109/JIOT.2019.2959599, Retrieved from the Internet: <URL: https://ieeexplore.ieee.org/abstract/document/8932408>.

* cited by examiner

| Bracket Parameters | Bracket Value |
|---|---|
| 37.5 – 42.5 % (Relative Humidity) | 001 |
| 32.5 – 37.4 % (Relative Humidity) | 002 |
| 42.6 – 47.5 % (Relative Humidity) | 003 |
| 30.0 – 32.4 % (Relative Humidity) | 004* |
| 47.6 – 50.0 % (Relative Humidity) | 005* |
| 0.0 – 29.9 % (Relative Humidity) | 006*** |
| 50.1 – 100.0 % (Relative Humidity) | 007*** |

| | |
|---|---|
| * | Notification |
| *** | Critical Notification |

FIG. 5A

| Time (Determined Frequency) | Bracket Value |
|---|---|
| 3:00 p.m. | 001 |
| 3:15 p.m. | |
| 3:30 p.m. | |
| 3:45 p.m. | 002 |
| 4:00 p.m. | 004* |

FIG. 5B

| Time (Determined Frequency) | Bracket Value |
|---|---|
| 3:00 p.m. | 001 |
| 3:15 p.m. | 001 |
| 3:30 p.m. | 001 |
| 3:45 p.m. | 002 |
| 4:00 p.m. | 004* |

FIG. 6A

| Time (Determined Frequency) | IoT Device 1 | IoT Device 2 | IoT Device 3 |
|---|---|---|---|
| 3:00 p.m. | 001 | 001 | 001 |
| 3:15 p.m. | 001 | 001 | 001 |
| 3:30 p.m. | 001 | 001 | 001 |
| 3:45 p.m. | 002 | 002 | 002 |
| 4:00 p.m. | 004* | 004* | 004* |

FIG. 6B

| Time (Determined Frequency) | Bracket Parameters |
|---|---|
| 3:00 p.m. | 37.5 – 42.5 |
| 3:15 p.m. | 37.5 – 42.5 |
| 3:30 p.m. | 37.5 – 42.5 |
| 3:45 p.m. | 32.5 – 37.4 |
| 4:00 p.m. | 30.0 – 32.4* |

FIG. 7A

| Time (Determined Frequency) | IoT Device 1 | IoT Device 2 | IoT Device 3 |
|---|---|---|---|
| 3:00 p.m. | 37.5 – 42.5 | 37.5 – 42.5 | 37.5 – 42.5 |
| 3:15 p.m. | 37.5 – 42.5 | 37.5 – 42.5 | 37.5 – 42.5 |
| 3:30 p.m. | 37.5 – 42.5 | 37.5 – 42.5 | 37.5 – 42.5 |
| 3:45 p.m. | 32.5 – 37.4 | 32.5 – 37.4 | 32.5 – 37.4 |
| 4:00 p.m. | 30.0 – 32.4* | 30.0 – 32.4* | 30.0 – 32.4* |

FIG. 7B

| Integrated Ledger |||||||
|---|---|---|---|---|---|---|
| Determined Frequency | Relative Humidity % ||| Temperature (Degrees Fahrenheit) |||
| IoT Device | 1 | 2 | 3 | 4 | 5 | 6 |
| 3:00 p.m. | 37.5 – 42.5 | 37.5 – 42.5 | 37.5 – 42.5 | 50.0 – 60.0 | 50.0 – 60.0 | 50.0 – 60.0 |
| 3:15 p.m. | 37.5 – 42.5 | 37.5 – 42.5 | 37.5 – 42.5 | 50.0 – 60.0 | 50.0 – 60.0 | 50.0 – 60.0 |
| 3:30 p.m. | 37.5 – 42.5 | 37.5 – 42.5 | 37.5 – 42.5 | 50.0 – 60.0 | 50.0 – 60.0 | 50.0 – 60.0 |
| 3:45 p.m. | 32.5 – 37.4 | 32.5 – 37.4 | 32.5 – 37.4 | 45.0 – 50.0 | 45.0 – 50.0 | 45.0 – 50.0 |
| 4:00 p.m. | 30.0 – 32.4* | 30.0 – 32.4* | 30.0 – 32.4* | 45.0 – 50.0 | 45.0 – 50.0 | 45.0 – 50.0 |

FIG. 8

OPTIMIZING DISTRIBUTED LEDGER STORAGE AND BATTERY USAGE IN IOT DEVICES

BACKGROUND

The present invention relates generally to the field of computing, and more particularly to distributed ledger technology.

Monitoring conditions of an environment (e.g., temperature, pressure, humidity, soil, or air composition, including other conditions), through the collection and storage of data, has been optimized by both Internet of Things (IoT) devices and distributed ledger technologies. IoT devices, equipped with sensors, may be capable of collecting large amounts of useful data and broadcasting the collected data so that the data may be shared and stored. A distributed ledger may allow for highly secure, transparent, immutable and tamper proof storage of the collected data. As a result, IoT devices may post large data packages to the ledger which may result in higher monetary costs to manage the constant inflow of data from these devices.

IoT devices and the data they collect have become critical to improving operational efficiency, reducing costs, and enhancing worker safety.

SUMMARY

Embodiments of the present invention disclose a method, computer system, and a computer program product for data optimization. The present invention may include performing a reading at a determined frequency, wherein the reading at the determined frequency is within a bracket parameter. The present invention may include determining a bracket value based on the bracket parameter. The present invention may include posting the bracket value to a subledger.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 5A is an exemplary illustration of bracket parameters with corresponding bracket values;

FIG. 5B is an exemplary illustration of a subledger maintained on an IoT device 118;

FIG. 6A is an exemplary illustration of one subledger completed by the data optimization program 110;

FIG. 6B is an exemplary illustration of more than one subledger completed by the data optimization program 110.

FIG. 7A is an exemplary illustration of one subledger translated by the data optimization program 110;

FIG. 7B is an exemplary illustration of more than one subledger translated by the data optimization program 110;

FIG. 8 is an exemplary illustration of more than one category and more than one subledger integrated by the data optimization program 110;

DETAILED DESCRIPTION

Figure 1:
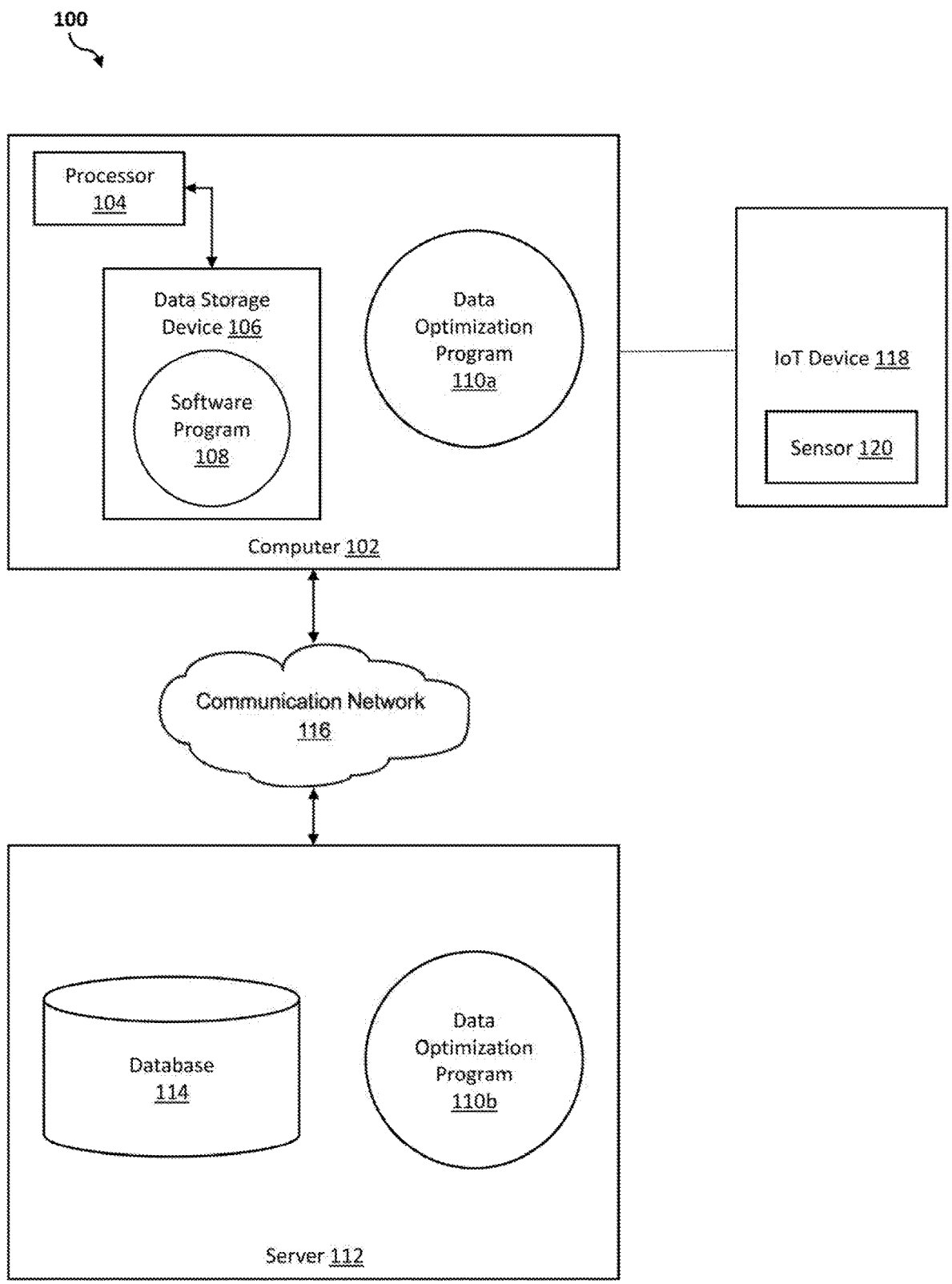
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for data optimization. As such, the present embodiment has the capacity to improve the technical field of distributed ledger technology by reducing the amount of data broadcasted and optimizing the battery efficiency in IoT devices. More specifically, the present invention may include performing a reading at a determined frequency, wherein the reading at the determined frequency is within a bracket parameter. The present invention may include determining a bracket value based on the bracket parameter. The present invention may include posting the bracket value to a subledger.

As described previously, monitoring conditions of an environment (e.g., temperature, pressure, humidity, soil, or air composition, including other conditions), through the collection and storage of data, has been optimized by both Internet of Things (IoT) devices and distributed ledger technologies. IoT devices, equipped with sensors, may be capable of collecting large amounts of useful data and broadcasting the collected data so that the data may be shared and stored. A distributed ledger may allow for highly secure, transparent, immutable and tamper proof storage of the collected data. As a result, IoT devices may post large data packages to the ledger which may result in higher monetary costs to manage the constant inflow of data from these devices.

IoT devices and the data they collect have become critical to improving operational efficiency, reducing costs, and enhancing worker safety.

Therefore, it may be advantageous to, among other things, perform a reading at a determined frequency, wherein the reading at the determined frequency is within a bracket parameter. Determine a bracket value based on the bracket parameter. Evaluate the bracket parameter to determine whether the bracket value differs from a previously posted bracket value to a subledger.

The determined frequency may be a predetermined length of time or a predetermined time of day, as opposed to a sensor connected to an IoT device continuously monitoring conditions of an environment.

According to at least one embodiment, the present invention may optimize distributed ledger storage by performing a reading at a determined frequency. Performing the reading at the determined frequency may reduce the amount of data that is stored by the distributed ledger.

Performing readings at the determined frequency may result in less data being stored by the distributed ledger.

According to at least one embodiment, the present invention may optimize battery usage in IoT devices by performing a reading at a determined frequency. Performing the reading at the determined frequency may reduce the amount of battery used by an IoT device.

According to at least one embodiment, the present invention may optimize distributed ledger storage by determining a bracket value based on the bracket parameter and evaluating the bracket parameter to determine whether the bracket value differs from a previously posted bracket value to a subledger.

Using a range of values (e.g., bracket parameters) may allow the present invention to group similar performed readings together and may reduce the amount of data posted and broadcasted to a distributed ledger (e.g., shared ledger).

According to at least one embodiment, the present invention may optimize battery usage in IoT devices by determining a bracket value based on the bracket parameter and evaluating the bracket parameter to determine whether the bracket value differs from a previously posted bracket value to a subledger.

Permitting the IoT device to re-enter sleep mode as opposed to posting a bracket value or performed reading may allow for better battery usage in IoT devices.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a data optimization program 110a. The networked computer environment 100 may also include a server 112 that is enabled to run a data optimization program 110b that may interact with a database 114 and a communication network 116. The networked computer environment 100 may include a plurality of computers 102 and servers 112, only one of which is shown. The computer 102 may be connected to an IoT device 118. The IoT device 118 may be equipped with a sensor 120. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 9, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the data optimization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the data optimization program 110a, 110b (respectively) to perform a reading at a determined frequency, determine a bracket value based on a bracket parameter, and evaluate the bracket value to determine whether the bracket value differs from a previously posted bracket value. The data optimization method is explained in more detail below with respect to FIGS. 2 through 8.

Figure 2:
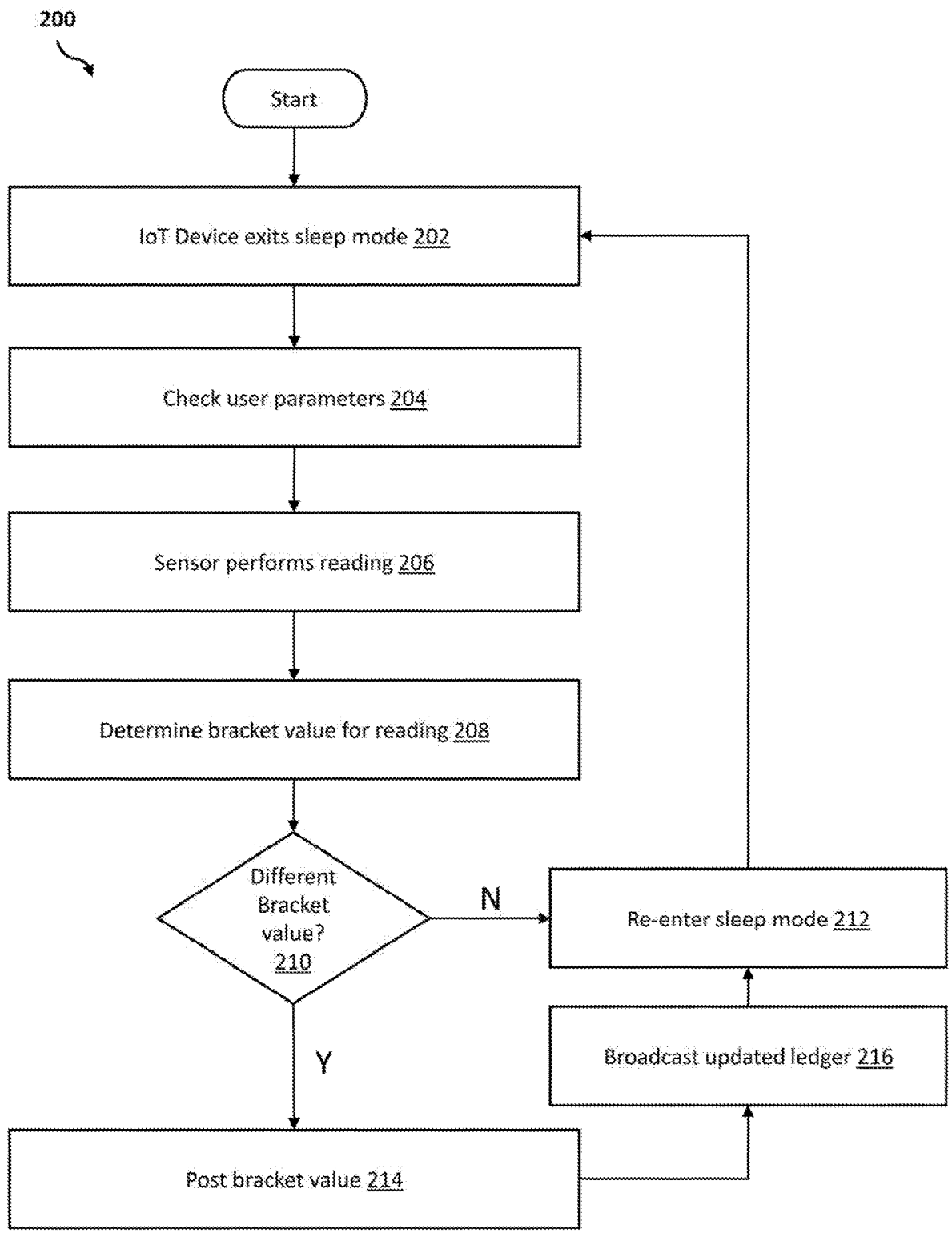
FIG. 2 is an operational flowchart illustrating a process for data optimization according to at least one embodiment.

Referring now to FIG. 2, an operational flowchart illustrating the exemplary data optimization process 200 used by the data optimization program 110a and 110b (hereinafter data optimization program 110) according to at least one embodiment is depicted.

At 202, an Internet of Things (IoT) device 118 exits sleep mode. The Internet of Things (IoT) device 118 may exit sleep mode at a determined frequency (e.g., a predetermined length of time, including 1 hour, 30 minutes, or 30 seconds, among other predetermined lengths of time; or a predetermined time of day, including 10 A.M., 1 P.M., or 9:15 P.M., among other predetermined times of day). The determined frequency may enable the IoT device 118 to save battery power by not remaining in an awakened state or performing constant monitoring. The determined frequency may have a default setting and may be further configured by a user in user parameters (e.g., user settings).

For example, a supplier (e.g., user, Sysadmin, System Administrator) may have two warehouses. In warehouse 1 the supplier (e.g., user, Sysadmin, System Administrator) may be storing delicate high-grade electronics. In warehouse 2 the supplier (e.g., user, Sysadmin, System Administrator) may be storing a durable metal product. Each warehouse may have IoT devices equipped with a sensor 120 which performs a reading in order to ensure that the contents of the warehouses are being safely kept. Accordingly, the supplier (e.g., user, Sysadmin, System Administrator) may set the determined frequency at every 30 minutes for warehouse 1 and set the determined frequency at every 3 hours for warehouse 2. The IoT devices may exit sleep mode at the determined frequency and may, at that frequency, capture the settings (e.g., perform a reading) of a condition within the warehouse (e.g., a temperature and/or a humidity, among other conditions).

At 204, the data optimization program 110 checks user parameters. The user parameters (e.g., user settings) may include, but are not limited to including, notifications, user configured notifications, number of brackets, bracket values, bracket value notifications, the determined frequency, a mandated posting frequency, type of sensor 120 reading, type of sensor 120 reading for a multi-purpose sensor 120

(e.g., device that can perform reading for temperature and humidity), and bracket parameters, among other parameters. The user (e.g., Sysadmin, System Administrator) may be authorized to change the user parameters. There may be more than one user (e.g., Sysadmin, System Administrator) authorized to change the user parameters. The data optimization program 110 may update the user parameters if the user parameters have been changed by the user (e.g., Sysadmin, System Administrator) since the last user parameter check.

The bracket parameters may be a range which may be set based on an environment. For example, the bracket parameters may be smaller for a consistent environment (e.g., an environment with consistent weather conditions such as San Diego, Calif.) as compared to an inconsistent environment (e.g., an environment with inconsistent weather conditions such as Fargo, N. Dak.).

The bracket parameters may be defined by a user in the user parameters (e.g., user settings). The bracket parameters may depend on the environment being monitored and the reading being performed by the sensor 120 connected to the IoT device 118. The user may define the bracket parameters based on the environmental and sensor 120 considerations. The bracket parameters may be a range of values (e.g., 10 degrees Fahrenheit to 15 degrees Fahrenheit, 15% relative humidity to 20% relative humidity, 6 pH to 7 pH) that the user determines in the user parameters are appropriate for the given environment. The range of values within the bracket parameters may have a unifying characteristic, for example, safe, optimal, normal, dangerous, acceptable, abnormal. The bracket parameters may be more granular if granular changes in the environmental conditions are being monitored and the bracket parameters may be broader if granular changes in the environment conditions are inconsequential.

The bracket parameters may enable the IoT device 118 to save battery power by not posting all performed readings. The bracket parameters may further reduce the amount of data broadcasted, which may enable more efficient storage. This will be explained in more detail with respect to FIG. 5A below.

Continuing with the example from step 202 above, a sensor 120 connected to the IoT device 118 (e.g., IoT device 118 equipped with a sensor 120) may be performing a humidity reading every 30 minutes for warehouse 1. The supplier (e.g., user, Sysadmin, System Administrator) may decide to adjust the determined frequency from every 30 minutes to every 15 minutes for warehouse 1 because of the delicacy of the high-grade electronics being stored. The data optimization program 110 may check the user parameters and the sensor 120 connected to the IoT device 118 may adjust to perform the humidity reading every 15 minutes for warehouse 1.

At 206, at least one sensor 120 performs a reading. The IoT device 118 may be connected to (e.g., equipped with) at least one sensor 120 (e.g., temperature sensor, motion sensor, humidity sensor, pressure sensor, proximity sensor, level sensor, accelerometers, gyroscope, gas sensor, infrared sensor, optical sensor, multi-purpose IoT sensor, among other sensors) to perform the reading. The sensor 120 may be able to perform more than one reading (e.g., temperature and humidity). The IoT device 118 may be connected to more than one sensor 120 (e.g., a temperature sensor 120 and a humidity sensor 120).

The reading, for example, may be 40% relative humidity. A relative humidity of 40% may fall within bracket parameters (e.g., a range, a pre-determined range, a range set by the user, 37.5%-42.5% relative humidity). The bracket parameters may have a bracket value (e.g., number corresponding to bracket parameters). For example, the bracket parameters may be 37.5%-42.5% relative humidity with a corresponding bracket value of 001. Accordingly, the sensor 120 connected to the IoT device 118 may perform one reading at 1 pm and the relative humidity may be 40% and the sensor 120 connected to the IoT device 118 may perform a second reading at 2 P.M. and the relative humidity may be 42%, even though the relative humidity increased by 2% both readings would have a bracket value of 001.

Electronics may only operate under limited humidity conditions (e.g., a relative humidity of 5% to 95%). A relative humidity closer to 95% may increase the conductivity of permeable insulators which may lead to malfunction. On the other hand, a relative humidity closer to 5% may favor the build-up of static electricity and may make materials brittle. Relative humidity may be the ratio of water vapor currently in the air to the maximum water vapor at that temperature, multiplied by 100. Air at higher temperatures may hold more water vapor, so the air with equal amounts of water vapor at, for example 32 degrees Fahrenheit and 90 degrees Fahrenheit may have drastically different relative humidity. The optimal humidity levels for electronics may be 30% to 50%.

Continuing with the example from step 204 above, the supplier (e.g., user, Sysadmin, System Administrator) may set 7 different bracket parameters in the user parameters (e.g., user settings).

Bracket parameters with corresponding bracket values will be described in more detail with respect to FIG. 5A below.

At 208, the data optimization program 110 evaluates the data to determine a bracket value. The bracket value may represent a corresponding bracket parameter. The bracket value for the corresponding bracket parameter may be determined in the user parameters (e.g., user settings).

Continuing with the example from step 206 above, the bracket value [001] had a corresponding bracket parameter of [37.5-42.5] percent relative humidity. Accordingly, the data optimization program 110 may determine any performed reading with a percent relative humidity between 37.5 and 42.5 corresponds to the bracket value [001].

At 210, the data optimization program 110 evaluates the bracket value to determine whether the bracket value is different from a previously posted bracket value.

The data optimization program 110 may determine whether the bracket value is different from the previously posted bracket value by evaluating the subledger maintained on the IoT device 118. Every IoT device 118 may maintain its own subledger. For example, FIG. 5B may be representative of the subledger maintained on the IoT device 118.

The user may set a mandated posting frequency, as will be described in more detail with respect to FIG. 4A and FIG. 4B below (hereinafter referred to as FIG. 4), to facilitate the detection of a malfunctioning IoT device 118 or sensor 120.

If the data optimization program 110 determines the bracket value is not different from the previously posted bracket value (e.g., previous bracket value posted to the subledger maintained on the IoT device 118, previous posted bracket value) then the data optimization program 110 proceeds to step 212 and the IoT device 118 re-enters sleep mode. The IoT device 118 may awaken from sleep mode based on the determined frequency (e.g., 30 seconds, 1 minute, 15 minutes, 3 P.M., or 2 A.M.).

If the data optimization program 110 determines the bracket value is different from the previously posted bracket value (e.g., previous bracket value posted to the subledger maintained on the IoT device 118, previous posted bracket value), then the data optimization program 110 proceeds to step 214 and posts the different bracket value to the subledger maintained on the IoT device 118. The data optimization program 110 then proceeds to step 216, as discussed in more detail below.

Continuing with the example from step 208 above, for warehouse 1 the determined frequency may be every 15 minutes. Accordingly, the sensor 120 connected to the IoT device 118 may be performing the humidity reading (e.g., a relative humidity percentage) at 3:00 P.M., 3:15 P.M., 3:30 P.M., 3:45 P.M., and 4:00 P.M. The humidity readings for those times may be 40.0%, 41.0%, 38.0%, 35.0%, and 31.0%, respectively. Therefore, the bracket values would be [001], [001], [001], [002], and [004], respectively, as described previously with respect to step 206 above. However, the data optimization program 110 may only post the bracket values for 3:00 P.M., 3:45 P.M., and 4:00 P.M. to the subledger maintained on the IoT device 118. In this example, the data optimization program 110 may determine the bracket value for the performed reading at 3:15 P.M. and at 3:30 P.M. are not different than the bracket value for the performed reading at 3:00 P.M. (e.g., the previously bracket value posted to the subledger maintained on the IoT device 118). Accordingly, the data optimization program 110 may proceed to step 212, with the IoT device 118 re-entering sleep mode.

Continuing with the present example, and as stated above, at 3:15 P.M. the sensor 120 connected to the IoT device 118 performed a reading of 41%. Since 41% falls within the same bracket parameters (e.g., 37.5-42.5%) as the 40% reading, performed at 3:00 P.M., the same bracket value (e.g., [001]) as the previously posted bracket value would be posted here. Thus, the data optimization program 110 would proceed to step 212 (e.g., re-enter sleep mode for the determined frequency, which in this example is 15 minutes).

Continuing with the present example, and as stated above, at 3:30 P.M. the sensor 120 connected to the IoT device 118 performed a reading of 38%. Once again, since the 38% reading falls within the same bracket parameters (e.g., 37.5-42.5%) as the 40% reading performed at 3:00 P.M., the same bracket value (e.g., [001]) as the previously posted bracket value (e.g., [001] at 3:00 P.M.) would be posted here. Thus, the data optimization program 110 would proceed to step 212 (e.g., re-enter sleep mode for the determined frequency, which in this example is 15 minutes).

Continuing with the present example, and as stated above, at 3:45 P.M. the sensor 120 connected to the IoT device 118 performed a reading of 35%. Since the 35% reading falls within different bracket parameters (e.g., 32.5-37.4%) than the previously posted bracket parameters, and thus has a different bracket value (e.g., [002]) than that of the previously posted bracket value (e.g., [001] at 3:00 P.M.), the data optimization program 110 would proceed to step 214 and post the different bracket value (e.g., [002]) to the subledger maintained on the IoT device 118. The data optimization program 110 proceeds to step 216.

Continuing with the present example, and as stated above, finally, at 4:00 P.M., the sensor 120 connected to the IoT device 118 performed a reading of 31%. Since the 31% reading falls within different bracket parameters (e.g., 30.0-32.4%) and thus has a different bracket value (e.g., [004]) than that of the previously posted bracket value (e.g., [002] at 3:45 P.M.), the data optimization program 110 would proceed to step 214 and post the different bracket value (e.g., [004]) to the subledger maintained on the IoT device 118.

The data optimization program 110 may broadcast a notification (e.g., may alert the supplier that the relative humidity percentage in warehouse 1 is below the optimal range for electronics, as configured in the user parameters). The data optimization program proceeds to step 216.

At 212, the IoT device 118 re-enters sleep mode. The IoT device 118 may re-enter sleep mode for the determined frequency.

At 214, the data optimization program 110 posts the bracket value. The data optimization program 110 may post the bracket value to the subledger. The subledger may be maintained on the IoT device 118.

At 216, the data optimization program 110 broadcasts the subledger. The data optimization program 110 may broadcast an updated subledger (e.g., subledger maintained on the IoT with the different bracket value). The data optimization program 110 may broadcast the updated subledger to a shared ledger (e.g., distributed ledger, hyperledger).

The shared ledger (e.g., distributed ledger, hyperledger) may be a database spread across several nodes on a peer-to-peer network (e.g., decentralized network). The shared ledger may be accessible by more than one user. The user may need authorization in order for the shared ledger to be accessible.

The shared ledger may maintain more than one subledger. The shared ledger may maintain the subledger of more than one IoT device 118.

For example, a company may have a warehouse with 50 different IoT devices. Each of the 50 different IoT devices may maintain a subledger. The shared ledger may maintain the subledger of all 50 different IoT devices.

Figure 3:
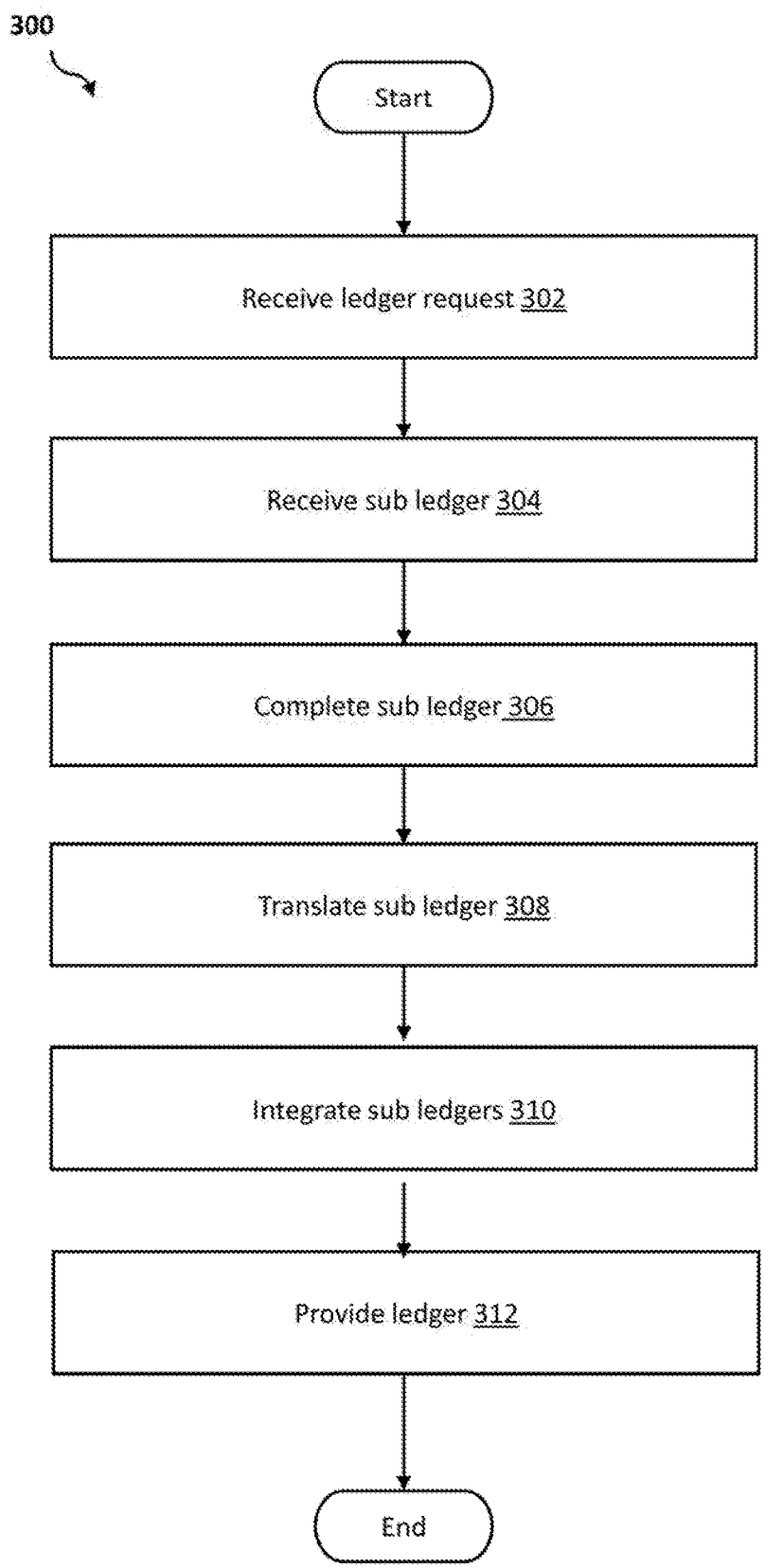
FIG. 3 is an operational flowchart illustrating a process for data interpretation according to at least one embodiment.

Referring now to FIG. 3, an operational flowchart illustrating the exemplary data interpretation process 300 used by the data optimization program 110 according to at least one embodiment is depicted. The data interpretation process 300 of FIG. 3 is substantially similar to the data optimization process 200 of FIG. 2 with steps 302-312 being added between step 212 and 202.

At 302, the data optimization program 110 receives a ledger request. The ledger request may be made by one or more users (e.g., Sysadmin, System Administrator). The one or more users may be authorized to request the ledger (e.g., requested ledger).

A requested ledger (e.g., ledger requested by the authorized user) may be comprised of fewer subledgers than are maintained on the shared ledger. For example, the shared ledger may maintain the subledger of 50 different IoT devices for a warehouse. Of those 50 different IoT devices 20 IoT devices may be equipped with a humidity sensor 120. The requested ledger may be for the relative humidity of the warehouse.

At 304, the data optimization program 110 accesses one or more subledgers maintained on the shared ledger. The data optimization program 110 accesses the one or more shared subledgers maintained on the shared ledger based on the requested ledger.

The data optimization program 110 may access one or more subledgers with missing bracket values. The one or more subledgers maintained on the shared ledger with missing bracket values may be described in more detail with respect to FIG. 5B below.

At 306, the data optimization program 110 completes the one or more subledgers maintained on the shared ledger. The data optimization program 110 may complete the one or more subledgers by filling in the missing bracket values (e.g., the bracket values not posted to the subledgers maintained on the IoT device 118, the bracket values not broadcast to the shared ledger by the data optimization program 110, as described previously with respect to step 210, 212, and 214 above).

One subledger completed by the data optimization program 110 may be described in more detail with respect to FIG. 6A below. More than one subledger (e.g., in instances where a warehouse has multiple IoT devices monitoring the humidity) completed by the data optimization program 110 may be described in more detail with respect to FIG. 6B below. In FIGS. 6A and 6B, the dotted pattern and bold bracket values depict the bracket values completed by the data optimization program 110.

At 308, the data optimization program 110 translates the one or more one subledgers maintained on the shared ledger. The data optimization program 110 may translate the bracket values of the one or more subledgers to the corresponding bracket parameters.

Translating the one or more subledgers from the bracket values to the bracket parameters may enable the user (e.g., Sysadmin, System Administrator) to more easily interpret the performed readings, as described previously with respect to step 206 above.

The translation of one subledger by the data optimization program 110 may be described in more detail with respect to FIG. 7A below. The translation of more than one subledger (e.g., in instances where a warehouse has multiple IoT devices monitoring the humidity) by the data optimization program 110 may be described in more detail with respect to FIG. 7A below. In FIGS. 7A and 7B, the dotted pattern and bold bracket parameters depict the bracket values completed by the data optimization program 110.

At 310, the data optimization program 110 may integrate one or more subledgers maintained on the shared ledger. Integrating the one or more subledgers maintained on the shared ledger may combine the one or more completed and translated subledgers maintained on the shared ledger. Integrating the one or more subledgers maintained on the shared ledger may create the ledger requested by the user (e.g., the requested ledger).

Integrating one or more subledgers maintained on the shared ledger may allow the user to compare data from the one or more subledgers maintained on the shared ledger. Integrating the one or more subledgers may create a ledger with the performed readings of multiple IoT devices. The requested ledger (e.g., integrated one or more subledgers) may include additional information, such as, but not limited to IoT device 118 location (e.g., where the IoT device 118 is located in the monitored environment, orientation in relation to other IoT devices), characteristics of the IoT device 118 location (e.g., shaded, on a hill, next to a window, near a vent, near a door, near a fan, or proximity to anything that may affect the performed reading).

If the user requested a ledger for the humidity of warehouse 1, then the data optimization program 110 may only integrate the one or more subledgers maintained on the shared ledger of IoT devices equipped with sensor 120s performing humidity readings.

A requested ledger with one or more integrated subledgers and one or more categories (e.g., humidity and temperature) may be described in more detail with respect to FIG. 8 below.

The requested ledger may have one or more categories if, for example, the user requests the ledger for a warehouse and requests subledgers may be integrated if, for example, the user (e.g., Sysadmin, System Administrator) requests the ledger for a warehouse and requests the readings of both relative humidity and temperature.

At 312, the data optimization program 110 provides the requested ledger to the user. The requested ledger may be provided using the bracket parameters enabling the user to easily read the ledger. For example, the ledger of FIG. 8 would easily enable the user to determine that the relative humidity percentage was between 37.5 and 42.5 at 3:00 P.M. and the temperature was between 50.0 and 60.0 degrees Fahrenheit at that time.

Figure 4A:
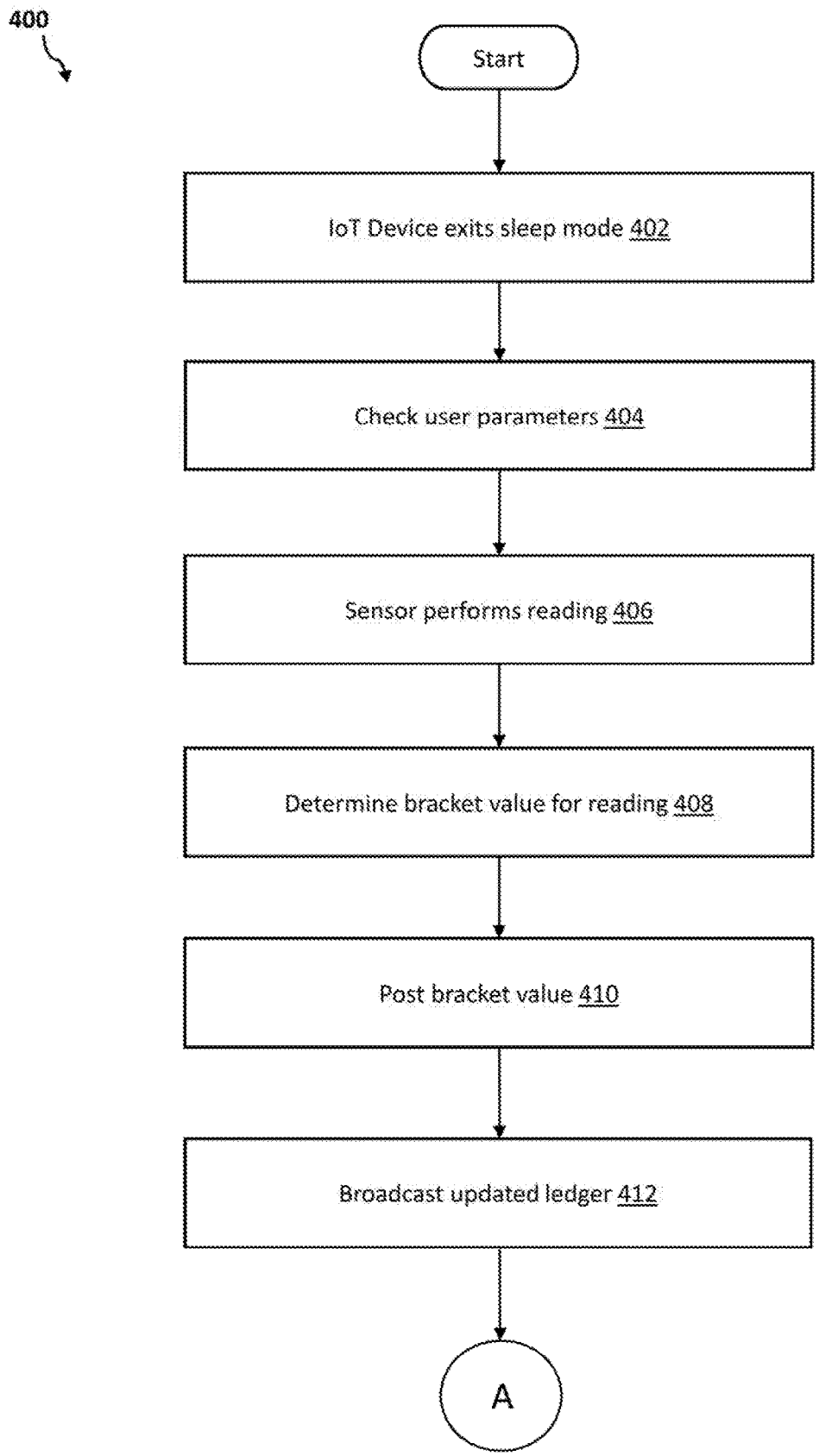
FIG. 4A a is an operational flowchart illustrating a process for malfunction detection according to at least one embodiment.
Figure 4B:
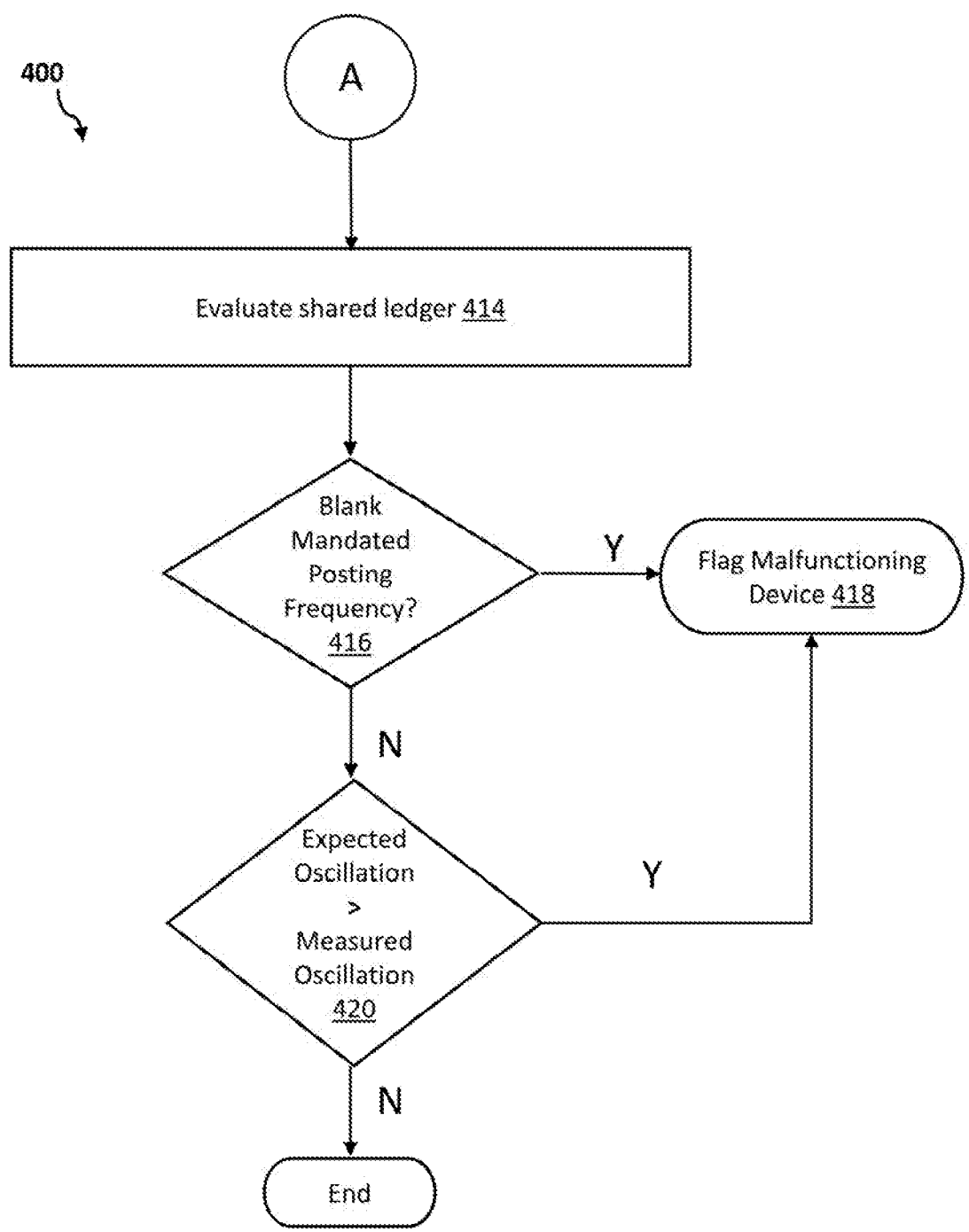
FIG. 4B is a continuation of the FIG. 4A operational flowchart illustrating a process for malfunction detections according to at least one embodiment.

Referring now to FIGS. 4A and 4B (hereinafter referred to as FIG. 4), an operational flowchart illustrating the malfunction detection process 400 used by the data optimization program 110 according to at least one embodiment is depicted. The malfunction detection process 400 shown in FIG. 4 is substantially similar to the data optimization process of FIG. 2 with steps 402-408 being substantially similar to steps 202-208.

At 402, the IoT device 118 exits sleep mode. The IoT device 118 may exit sleep mode based on a mandated posting frequency (e.g., mandated posting time) configured in the user parameters. The mandated posting frequency (e.g., a predetermined length of time, such as every 48 hours; or a predetermined time of day, such as at 5 P.M. every day) may represent a frequency with which the user parameters mandate the IoT device 118 post a bracket value (e.g., broadcast to the subledger). For example, the user may mandate a bracket value be posted at 5 P.M. every day. to ensure that the IoT device 118 is functioning properly and has sufficient battery.

The mandated frequency may be important in a consistent or controlled environment. In a consistent or controlled environment there may not be as many changes in bracket parameters as in an inconsistent or uncontrolled environment. Mandating the IoT device 118 post (e.g., broadcast to the subledger) at a mandated frequency may help ensure the device is functioning properly and has sufficient battery.

At 404, the data optimization program 110 checks user parameters. The user parameters (e.g., user settings) may include, but are not limited to including, the mandated posting frequency. The user may be authorized to change the user parameters. There may be more than one user authorized to change the user parameters. The data optimization program 110 may update the user parameters if the user parameters have been changed by the user since the last user parameter check. The data optimization program 110 may check to if the mandated posting frequency has been changed.

At 406, at least one sensor 120 performs a reading. The at least one sensor 120 may perform the reading at the mandated posting frequency. The IoT device 118 may be connected to (e.g., equipped with) at least one sensor 120 (e.g., temperature sensor, motion sensor, humidity sensor, pressure sensor, proximity sensor, level sensor, accelerometers, gyroscope, gas sensor, infrared sensor, optical sensor, multi-purpose IoT sensor, among other sensors) to perform the reading.

At 408, the data optimization program 110 evaluates the data to determine a bracket value. The data (e.g., reading performed by the sensor 120 connected to the IoT device 118) may fall within a bracket parameter. The bracket parameter may have a corresponding bracket value.

At 410, the data optimization program 110 posts the bracket value to the subledger maintained on the IoT device 118. The data optimization program 110 may post the bracket value to the subledger maintained on the IoT device 118 irrespective of the previously posted bracket value.

At 412, the data optimization program 110 broadcasts the subledger maintained on the IoT device 118 to the shared ledger.

At 414, the data optimization program 110 evaluates the shared ledger. The data optimization program 110 may evaluate the shared ledger automatically at the mandated posting frequency.

At 416, the data optimization program 110 evaluates the mandated posting time. The data optimization program may evaluate the shared ledger to determine whether each IoT device 118 posted to the subledger. If the data optimization program 110 determines the IoT device 118 did not post to the subledger at the mandated posting time, then the data optimization program proceeds to step 418. If the data optimization program 110 determines the IoT device 118 did post to the subledger at the mandated posting time, then the data optimization program proceeds to step 420.

At 418, the data optimization program 110 may send a notification to the user that the IoT device 118 has been flagged. If, at 416, the data optimization program 110 determined that the IoT device 118 did not post to the subledger at the mandated posting time, then at 418, the data optimization program 110 flags the malfunctioning IoT device 118.

Flagging the malfunctioning IoT device 118 may include, but is not limited to including, alerting the location where the IoT device 118 is located, sending a notification to the user, marking the shared ledger. The IoT device 118 not posting to the subledger may indicate, the IoT device 118 is out of battery, the IoT device 118 is unable to broadcast to the shared ledger, the sensor 120 connected to the IoT device 118 is broken, among other things.

At 420, the data optimization program 110 determines whether an expected oscillation is greater than a measured oscillation. The expected oscillation may be the number of bracket changes expected within the determined frequency. The measured oscillation may be the number of bracket changes posted to the subledger within the determined frequency.

The data optimization program 110 may evaluate one or more subledgers of other IoT devices in order to determine the expected oscillation. The expected oscillation may be determined by the user in the user parameters.

If the data optimization program 110 determines the expected oscillation is greater than the measured oscillation, then the data optimization program 110 goes back to step 418. If, alternatively, the data optimization program 110 determines the expected oscillation is not greater than the measured oscillation, then the malfunction detection process ends.

Referring now to FIG. 5A, an exemplary illustration of bracket parameters with corresponding bracket values is depicted. The bracket parameters depicted are [37.5-42.5], [32.5-37.4], [42.6-47.5], [30.0-32.4], [47.6-50.0], [0.0-29.9], and [50.1-100.0] % relative humidity, with the corresponding bracket values depicted of [001], [002], [003], [004], [005], [006], and [007].

The user may determine the bracket parameters and corresponding bracket values in the user parameters (e.g., settings). Additionally, the user may set notification in the user parameters as depicted here for the bracket values [004], [005], [006], and [007].

Referring now to FIG. 5B, an exemplary illustration of a subledger maintained on an IoT device 118 is depicted. The subledger maintained on the IoT device 118 depicted illustrates the data optimization program 110 may have posted to the subledger maintained on the IoT device 118 at 3:00 P.M., 3:45 P.M., and 4:00 P.M. The missing bracket values depicted at 3:15 P.M. and 3:30 P.M. may depict that the reading at those times performed by the sensor 120 connected to the IoT device 118 may have had the same bracket value (e.g., [101]) as was posted by the data optimization program 110 at 3:00 P.M.

Referring now to FIG. 6A, an exemplary illustration of one subledger completed by the data optimization program 110 is depicted. The data optimization program 110 may complete the one or more subledgers by filling in the missing bracket values (e.g., the bracket values not posted to the subledgers maintained on the IoT device 118, the bracket values not broadcast to the shared ledger by the data optimization program 110).

The dotted pattern and bold bracket values may depict the bracket values completed by the data optimization program 110.

Referring now to FIG. 6B, an exemplary illustration of more than one subledger translated by the data optimization program 110 is depicted. The data optimization program 110 may complete the one or more subledgers by filling in the missing bracket values (e.g., the bracket values not posted to the subledgers maintained on the IoT device 118, the bracket values not broadcast to the shared ledger by the data optimization program 110).

In FIG. 6B, the dotted pattern and bold bracket values may depict the bracket values completed by the data optimization program 110.

Referring now to FIG. 7A, an exemplary illustration of one subledger translated by the data optimization program 110 is depicted. Translating the one or more subledgers from the bracket values to the bracket parameters may enable the user (e.g., Sysadmin, System Administrator) to more easily interpret the performed readings.

In FIG. 7A the user may be able to determine that the relative humidity was between 37.5 and 42.5 percent at 3:00 P.M., 3:15 P.M., and 3:30 P.M. The user may be able to further determine that the relative humidity dropped to between 32.5 and 37.4 percent at 3:45 P.M. and continued to drop to between 30.0 and 32.4 percent at 4:00 P.M.

Referring now to FIG. 7B, an exemplary illustration of more than one subledger translated by the data optimization program 110 is depicted. Translating the one or more subledgers from the bracket values to the bracket parameters may enable the user (e.g., Sysadmin, System Administrator) to more easily interpret the performed readings.

In FIG. 7B the user may be able to compare the relative humidity readings from multiple IoT devices and see the range of values (e.g., bracket parameters) the performed reading fell between. In FIG. 7B the user may be able to determine that the relative humidity was between 37.5 and 42.5 percent at 3:00 P.M., 3:15 P.M., and 3:30 P.M. The user may be able to further determine that the relative humidity dropped to between 32.5 and 37.4 percent at 3:45 P.M. and continued to drop to between 30.0 and 32.4 percent at 4:00 P.M for IoT device 118 1, IoT device 118 2, and IoT device 118 3.

Referring now to FIG. 8, an exemplary illustration of more than one category and more than one subledger integrated by the data optimization program 110 is depicted. Integrating one or more subledgers maintained on the shared ledger may allow the user to compare data from the one or more subledgers maintained on the shared ledger. Integrating the one or more subledgers may create a ledger with the performed readings of multiple IoT devices.

In FIG. 8, the user may have requested a ledger for two categories (e.g., relative humidity and temperature) and the data optimization program integrated six subledgers (e.g., IoT device 1, IoT device 2, IoT device 3, IoT device 4, IoT device 5, and IoT device 6). Accordingly, in FIG. 8, the user may be able to determine a relationship between the drop in relative humidity percentage at the 3:45 P.M. performed reading and the drop in temperature in degrees Fahrenheit at the 3:45 P.M. performed reading.

It may be appreciated that FIGS. 2 through 8 provide only an illustration of one embodiment and do not imply any limitations with regard to how different embodiments may be implemented. Many modifications to the depicted embodiment(s) may be made based on design and implementation requirements.

Figure 9:
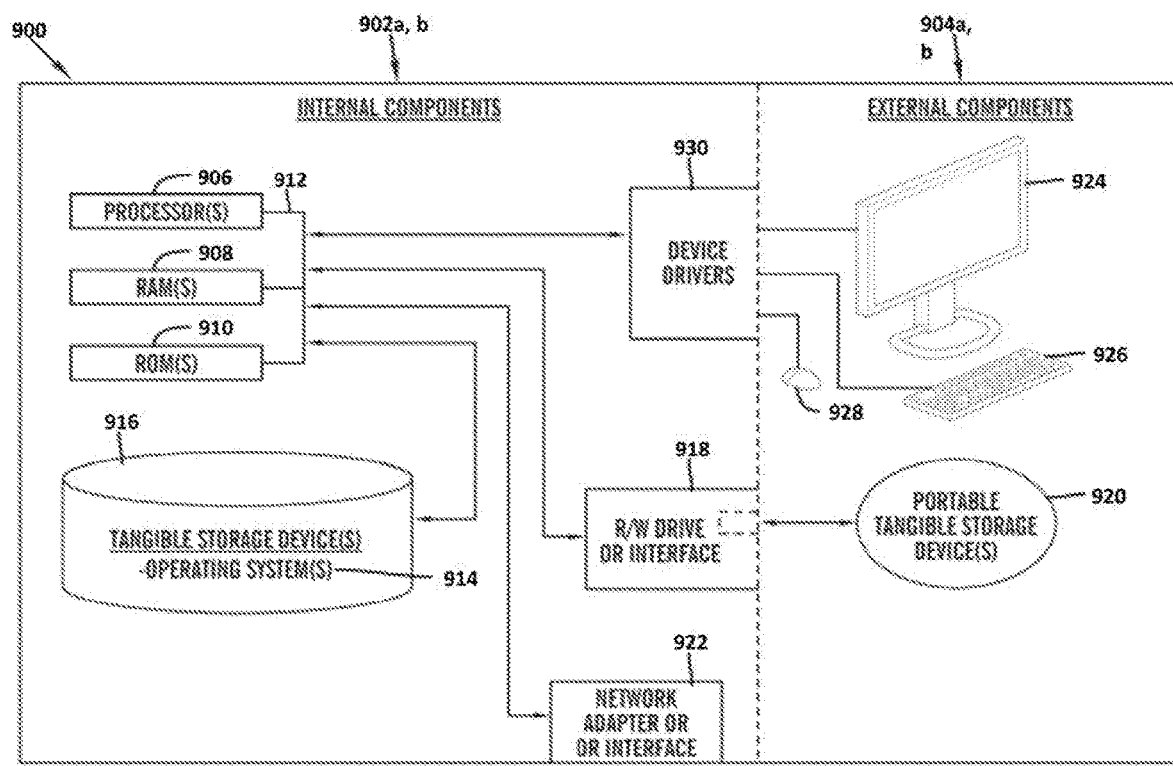
FIG. 9 is a block diagram of internal and external components of computers and servers depicted in FIG. 1 according to at least one embodiment.

FIG. 9 is a block diagram 900 of internal and external components of computers depicted in FIG. 1 in accordance with an illustrative embodiment of the present invention. It should be appreciated that FIG. 9 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 9. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the data optimization program 110*a* in client computer 102, and the data optimization program 110*b* in network server 112, may be stored on one or more computer-readable tangible storage devices 916 for execution by one or more processors 906 via one or more RAMs 908 (which typically include cache memory). In the embodiment illustrated in FIG. 9, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the data optimization program 110*a* and 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the data optimization program 110*a* in client computer 102 and the data optimization program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the data optimization program 110*a* in client computer 102 and the data optimization program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
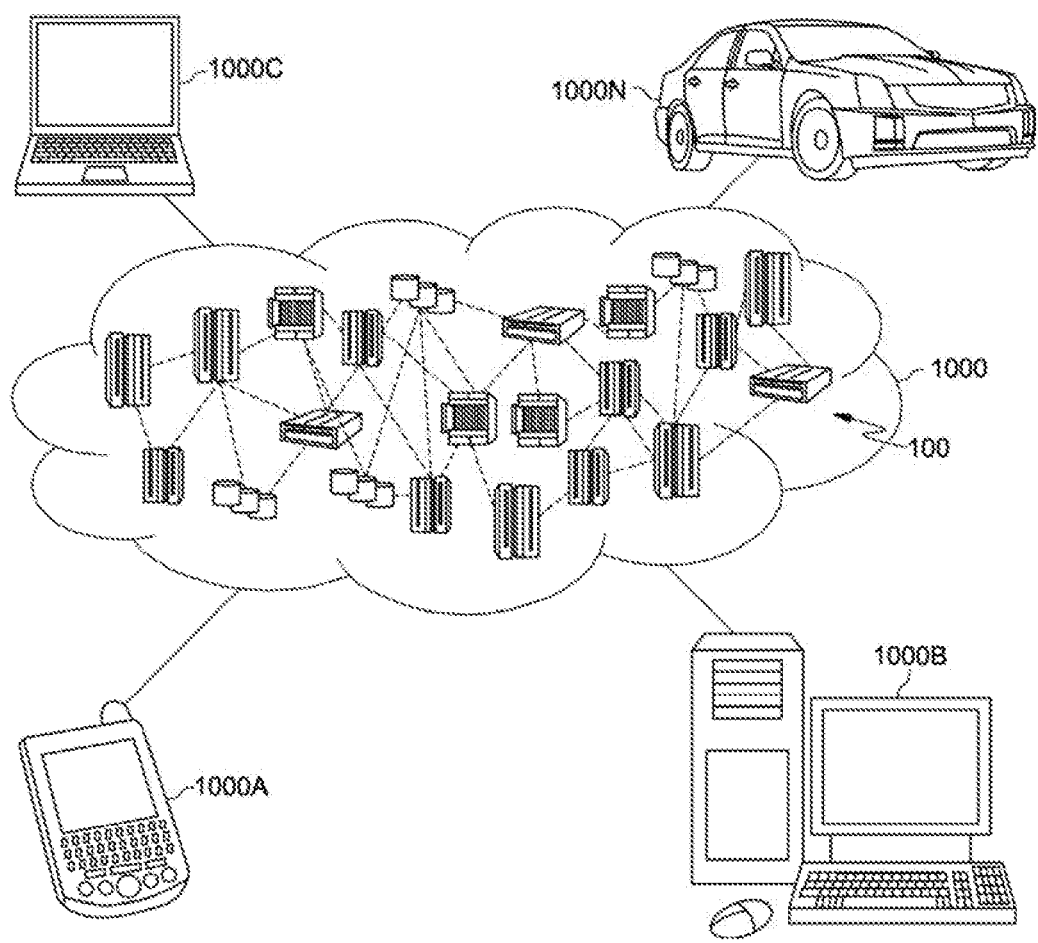
FIG. 10 is a block diagram of an illustrative cloud computing environment including the computer system depicted in FIG. 1, in accordance with an embodiment of the present disclosure.

Referring now to FIG. 10, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 10 are intended to be illustrative only and that computing nodes 100 and cloud computing environment 1000 can communicate with any type of computerized device over any type of network and/or network addressable connection (e.g., using a web browser).

Figure 11:
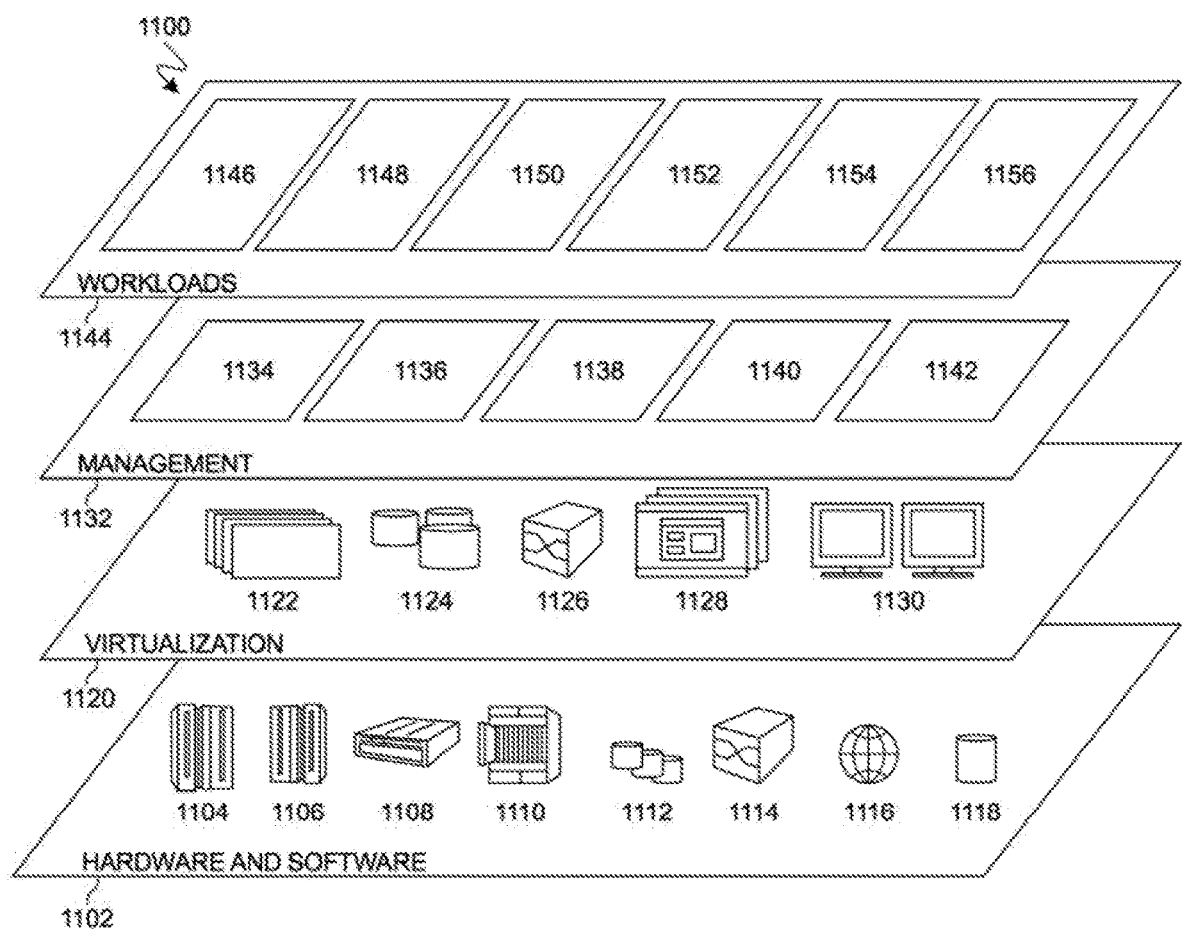
FIG. 11 is a block diagram of functional layers of the illustrative cloud computing environment of FIG. 10, in accordance with an embodiment of the present disclosure.

Referring now to FIG. 11, a set of functional abstraction layers 1100 provided by cloud computing environment 1000 is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data optimization 1156. A data optimization program 110a, 110b provides a way to perform a reading at a determined frequency, determine a bracket value based on a bracket parameter, and evaluate the bracket value to determine whether the bracket value differs from a previously posted bracket value to a subledger.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data optimization, the method comprising:
    performing a reading, utilizing at least one sensor connected to an IoT device, at a determined frequency, wherein the IoT device exits a sleep mode at the determined frequency, wherein the reading at the determined frequency is within a bracket parameter, wherein the bracket parameter includes a range of values sharing a unifying characteristic;
    determining a bracket value based on the bracket parameter;
    posting the bracket value to a subledger in response to the bracket value differing from a previously posted bracket value, wherein the subledger is maintained on the IoT device and the subledger is comprised of one or more bracket values previously posted in response to one or more previous readings;
    broadcasting the subledger with the bracket value differing from the previously posted bracket value to a shared ledger, wherein the shared ledger maintains a plurality of subledgers, wherein the IoT device re-enters the sleep mode after the subledger is broadcasted to the shared ledger;
    receiving a request for a ledger from a user, the ledger requested by the user being comprised of less than the plurality of subledgers maintained by the shared ledger;
    determining that the request for the ledger is comprised of one or more subledgers;
    evaluating the one or more subledgers to determine at least one missing bracket value and completing each of the one or more subledgers by filling in the at least one missing bracket value based on the previously posted bracket value;
    translating each of the one or more subledgers using a corresponding bracket parameter of the bracket value;
    generating a requested ledger, wherein the requested ledger includes an integration of each of the one or more subledgers; and
    providing the requested ledger to the user.

2. The method of claim 1, wherein posting the bracket value to the subledger occurs after performing a plurality of readings at the determined frequency.

3. The method of claim 1, further comprising:
    checking at least one user parameter prior to performing the reading.

4. The method of claim 1, wherein determining the bracket value differs from the previously posted bracket value further comprises:
    determining whether an expected oscillation is greater than a measured oscillation, wherein the expected oscillation is the number of bracket changes expected within the determined frequency.

5. The method of claim 4, further comprising:
    determining the expected oscillation is greater than the measured oscillation; and
    sending a notification to the user that the IoT device has been flagged.

6. The method of claim 5, wherein the notification includes a location of the IoT device which has been flagged.

7. The method of claim 4, wherein the expected oscillation is determined by the user in a set of user parameters.

8. The method of claim 1, wherein the requested ledger provided to the user includes at least a location and characteristics of the location for one or more IoT devices, wherein the one or more IoT devices correspond to the one or more subledgers integrated for the requested ledger.

9. The method of claim 1, wherein the requested ledger includes at least two different categories, wherein the at least two different categories are identified by the user in the ledger request.

10. A computer system for data optimization, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    performing a reading, utilizing at least one sensor connected to an IoT device, at a determined frequency, wherein the IoT device exits a sleep mode at the determined frequency, wherein the reading at the determined frequency is within a bracket parameter, wherein the bracket parameter includes a range of values sharing a unifying characteristic;
    determining a bracket value based on the bracket parameter;
    posting the bracket value to a subledger in response to the bracket value differing from a previously posted bracket value, wherein the subledger is maintained on the IoT device and the subledger is comprised of one or more bracket values previously posted in response to one or more previous readings;
    broadcasting the subledger with the bracket value differing from the previously posted bracket value to a shared ledger, wherein the shared ledger maintains a plurality of subledgers, wherein the IoT device re-enters the sleep mode after the subledger is broadcasted to the shared ledger;
    receiving a request for a ledger from a user, the ledger requested by the user being comprised of less than the plurality of subledgers maintained by the shared ledger;
    determining that the request for the ledger is comprised of one or more subledgers;
    evaluating the one or more subledgers to determine at least one missing bracket value and completing each of the one or more subledgers by filling in the at least one missing bracket value based on the previously posted bracket value;
    translating each of the one or more subledgers using a corresponding bracket parameter of the bracket value;

generating a requested ledger, wherein the requested ledger includes an integration of each of the one or more subledgers; and providing the requested ledger to the user.

11. The computer system of claim 10, wherein posting the bracket value to the subledger occurs after performing a plurality of readings at the determined frequency.

12. The computer system of claim 10, further comprising:

checking at least one user parameter prior to performing the reading.

13. The method of claim 10, wherein determining the bracket value differs from the previously posted bracket value further comprises:

determining whether an expected oscillation is greater than a measured oscillation, wherein the expected oscillation is the number of bracket changes expected within the determined frequency.

14. The method of claim 13, further comprising:

determining the expected oscillation is greater than the measured oscillation; and sending a notification to the user that the IoT device has been flagged.

15. A computer program product for data optimization, comprising:

one or more non-transitory computer-readable storage media and program instructions stored on at least one of the one or more tangible storage media, the program instructions executable by a processor to cause the processor to perform a method comprising:

performing a reading, utilizing at least one sensor connected to an IoT device, at a determined frequency, wherein the IoT device exits a sleep mode at the determined frequency, wherein the reading at the determined frequency is within a bracket parameter, wherein the bracket parameter includes a range of values sharing a unifying characteristic;

determining a bracket value based on the bracket parameter;

posting the bracket value to a subledger in response to the bracket value differing from a previously posted bracket value, wherein the subledger is maintained on the IoT device and the subledger is comprised of one or more bracket values previously posted in response to one or more previous readings;

broadcasting the subledger with the bracket value differing from the previously posted bracket value to a shared ledger, wherein the shared ledger maintains a plurality of subledgers, wherein the IoT device re-enters the sleep mode after the subledger is broadcasted to the shared ledger;

receiving a request for a ledger from a user, the ledger requested by the user being comprised of less than the plurality of subledgers maintained by the shared ledger;

determining that the request for the ledger is comprised of one or more subledgers;

evaluating the one or more subledgers to determine at least one missing bracket value and completing each of the one or more subledgers by filling in the at least one missing bracket value based on the previously posted bracket value;

translating each of the one or more subledgers using a corresponding bracket parameter of the bracket value;

generating a requested ledger, wherein the requested ledger includes an integration of each of the one or more subledgers; and providing the requested ledger to the user.

16. The computer program product of claim 15, wherein posting the bracket value to the subledger occurs after performing a plurality of readings at the determined frequency.

17. The computer program product of claim 15, further comprising:

utilizing at least one sensor connected to an IoT device.

* * * * *